US010035374B2

(12) United States Patent
Martin

(10) Patent No.: US 10,035,374 B2
(45) Date of Patent: Jul. 31, 2018

(54) SKULL MOUNT FOR USE IN SKULL MOUNTING

(71) Applicant: McKENZIE SPORTS PRODUCTS, LLC, Salisbury, NC (US)

(72) Inventor: Roger A. Martin, Albemarle, NC (US)

(73) Assignee: McKenzie Sports Products, LLC, Salisbury, NC (US)

(*) Notice: Subject to any disclaimer, the term of this patent is extended or adjusted under 35 U.S.C. 154(b) by 300 days.

(21) Appl. No.: 14/866,132

(22) Filed: Sep. 25, 2015

(65) Prior Publication Data

US 2017/0087925 A1 Mar. 30, 2017

(51) Int. Cl.
*G09B 23/00* (2006.01)
*B44C 5/02* (2006.01)
*B44C 5/06* (2006.01)

(52) U.S. Cl.
CPC . *B44C 5/02* (2013.01); *B44C 5/06* (2013.01)

(58) Field of Classification Search
USPC ................ 434/262, 263, 267, 274, 295, 296
See application file for complete search history.

(56) References Cited

U.S. PATENT DOCUMENTS 2,831,271 A 4/1958 Stitt
4,464,440 A 8/1984 Dotzman
4,477,500 A 10/1984 Powell
4,775,323 A * 10/1988 Johnson ................. G09B 23/30 428/16
4,971,865 A 11/1990 Nowlan
5,472,765 A 12/1995 Green
6,007,881 A 12/1999 Lennard
6,458,434 B1 10/2002 Coombs, Jr.
6,799,974 B2 10/2004 Martin et al.
6,884,080 B2 4/2005 Thompson
7,243,888 B2 7/2007 Peek
7,857,266 B2 12/2010 Damin
8,162,670 B2 * 4/2012 Hacke .................... G09B 23/36 428/16
8,512,045 B2 * 8/2013 Bittner ...................... B32B 1/00 428/34.1
8,758,023 B2 * 6/2014 Bittner ...................... B32B 1/00 428/34.1
9,248,696 B2 * 2/2016 Maria ....................... B44C 5/02
2006/0154224 A1 7/2006 St. Ama
(Continued)

OTHER PUBLICATIONS

Mountain Mikes Reproductions, http://masterofskulls.com, accessed and printed Mar. 23, 2016, 1 page.

*Primary Examiner* — Kurt Fernstrom
(74) *Attorney, Agent, or Firm* — Moore & Van Allen PLLC; Nicholas C. Russell

(57) ABSTRACT

Embodiments of the invention are directed to a skull mount for skull mounting or European mounting to display an animal skull with antlers. The skull mount comprises two pieces, a base and a skull plate cover. A skull plate with antlers affixed thereto may be positioned on the base. This way, since the antlers are still attached to the skull plate, it provides natural positioning of the antlers for that animal. The skull plate cover then registers on the base and covers a portion of the skull plate of the animal. As such, the skull mount covers the skull plate and provides a skull mount with naturally positioned antlers within an anatomically correct skull cover patterning.

22 Claims, 10 Drawing Sheets

(56) References Cited

U.S. PATENT DOCUMENTS

| | | | | |
|---|---|---|---|---|
| 2008/0069977 | A1 | 3/2008 | McAbee | |
| 2009/0075245 | A1 | 3/2009 | Hacke | |
| 2011/0031363 | A1 | 2/2011 | Shaw | |
| 2011/0091857 | A1 | 4/2011 | Eppley | |
| 2011/0091858 | A1 | 4/2011 | Eppley | |
| 2011/0183085 | A1* | 7/2011 | Spiess | B44C 3/06 428/16 |
| 2012/0219731 | A1* | 8/2012 | Paragamian | B44C 5/02 428/16 |

* cited by examiner

SKULL MOUNT FOR USE IN SKULL MOUNTING

BACKGROUND

Skull mounts or European mounts for the display of animal skulls with horns, antlers are popular for hunters to display their animals and for home decoration alike. Traditional skull mounts require the cleaning of the animal skull of skin and flesh in order to display the animal skull with antlers. However, more recently, plastic or molded skulls have been used for mounting antlers to, thus eliminating the need to clean or prepare an animal skull for skull mounting. Two types of skull mounts are typically available, one where the antler of animal attaches to the pedicle of the skull mount and the other where the skull plate of the animal attaches to the skull mount. However, proper positioning of the antlers and attractive esthetics of the mount can be difficult to achieve with these molds.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing a two piece skull mount. The two piece skull mount includes a base and a skull plate cover. The base receives a skull plate of an animal that includes antlers or horns attached thereto.

In this way, the antlers or horns are positioned anatomically correct and will not be out of orientation with respect to one another because they are still attached to the animal skull plate. Once the base receives the skull plate of the animal, the second piece of the skull mount, the skull plate cover is affixed or operatively coupled to the base. The skull plate cover covers the animal's skull plate and any mounting means used to affix the skull plate to the base. The skull plate cover further includes detail of the animal skull for completion of the skull mount. Thus, providing a realistic and detailed architecture of the animal's skull as a skull mount mold, which encloses or partially encapsulates the skull plate of the animal for a more uniform appearance.

Embodiments of the invention relate to apparatuses for skull mounting, the skull mount or mold for skull mounting comprising: a base, wherein the base comprises a skull plate receiving portion configured for receiving at least a portion of a skull plate of an animal; and a skull plate cover, wherein the skull plate cover covers at least a portion of the skull plate of the animal and at least a portion of the base, wherein the base is configured for operative coupling with the skull plate cover to form the skull mount.

In some embodiments, the base and the skull plate cover form a cavity within the skull mount to accept at least a portion of the skull plate of the animal. In some embodiments, the cavity further comprises at least one aperture for antlers operatively coupled to the skull plate of the animal to extend through and outside the cavity of the skull mount.

In some embodiments, the skull plate receiving portion further comprises a recess within the base to accept at least a portion of the skull plate of the animal.

In some embodiments, the base further comprises a relief portion for receiving at least a portion of the skull plate cover.

In some embodiments, the base further comprises at least one registration aperture for receiving and registering at least one pin extending from the skull plate cover, wherein the at least one registration aperture is within the relief portion of the base.

In some embodiments, the skull plate cover comprises a first side and a second side, wherein the first side of the skull plate cover comprises skull plate details of the animal.

In some embodiments, the skull plate cover comprises a first side and a second side, wherein the second side of the skull plate cover comprises at least one pin for registering with a registration aperture of the base.

In some embodiments, the base is configured to receive and register the skull plate cover to form the skull mount.

In some embodiments, the skull plate cover further comprises at least one antler aperture that allows antlers operatively coupled to the skull plate of the animal to extend outward from the skull mount.

In some embodiments, the skull plate cover fits into the relief portion of the base, wherein the thickness of the skull plate cover is a same thickness as the relief thus providing a smooth transition between the base and the skull plate cover to form the skull mount.

In some embodiments, the at least a portion of the skull plate of the animal comprises antlers integral with the skull plate, wherein the skull plate of the animal comprises the skull plate of the animal or a mold of the skull plate of the animal.

In some embodiments, the relief portion comprises a first relief portion and a second relief portion, and wherein the skull plate receiving portion of the base comprises a recess located between the first relief portion and the second relief portion and the recess of the skull plate receiving portion is recessed from surfaces of the first relief portion and the second relief portion.

In some embodiments, the base is formed from ridged material capable of accepting a screw or an epoxy for operatively coupling the skull plate of the animal to the base.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
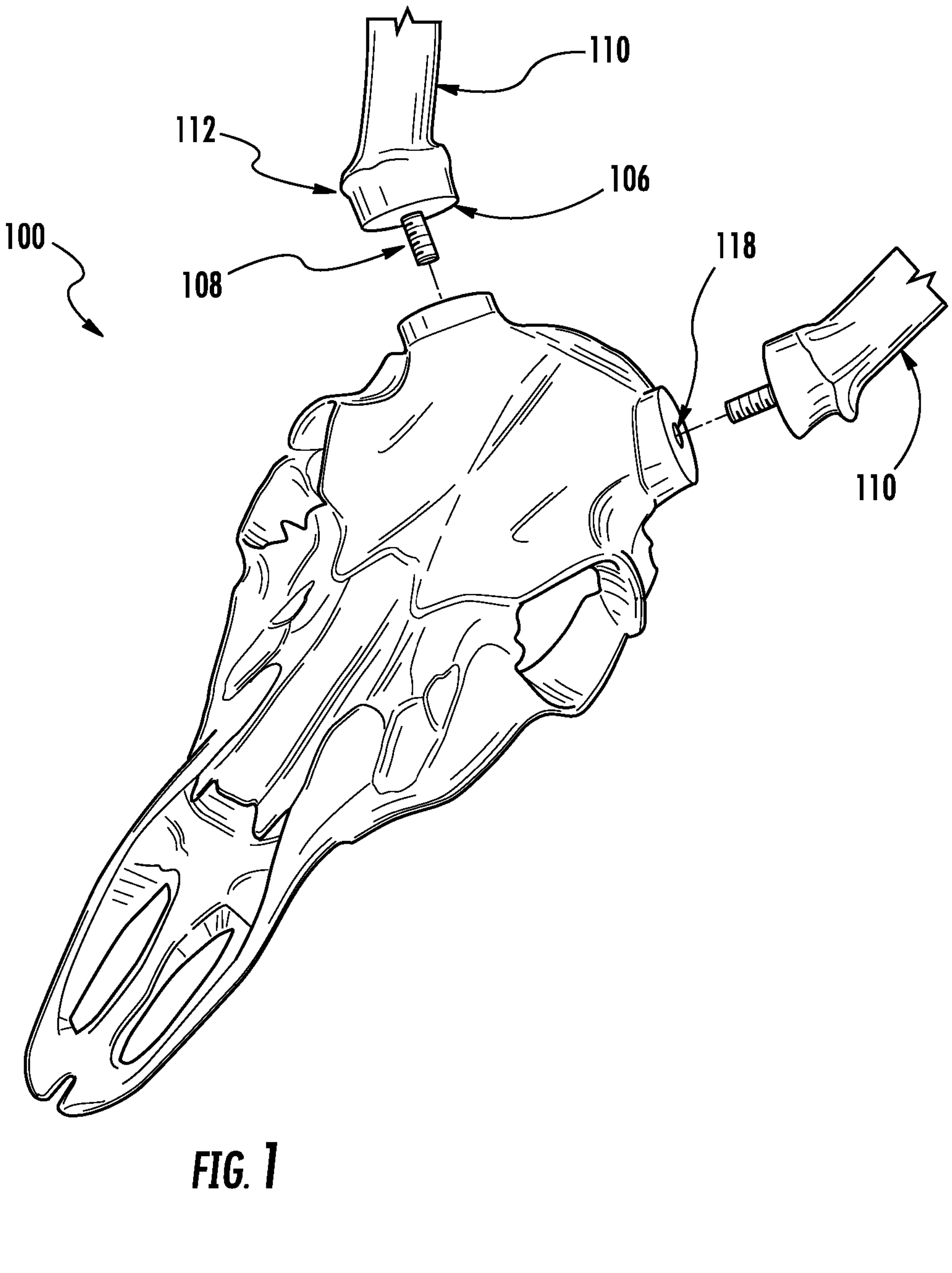
Figure 2:
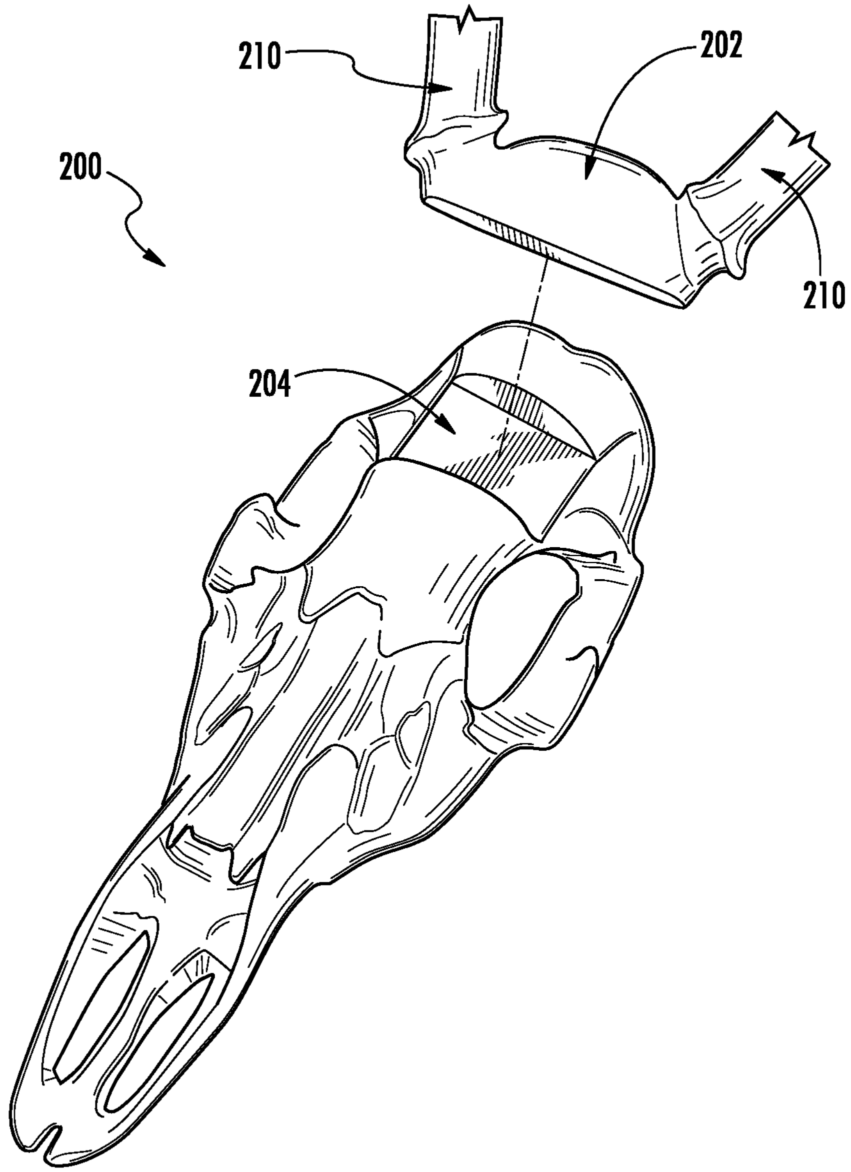
Figure 3:
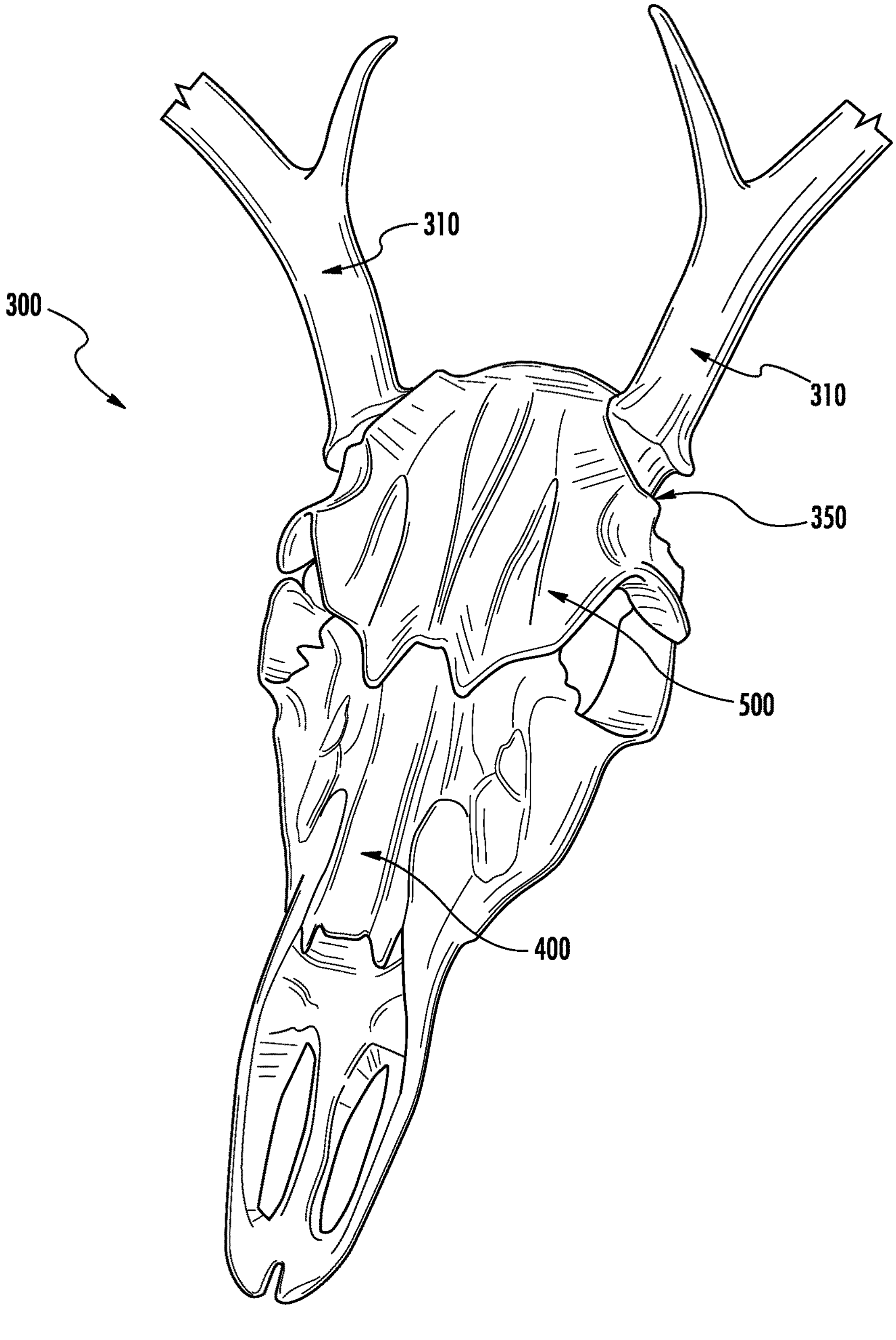
Figure 4:
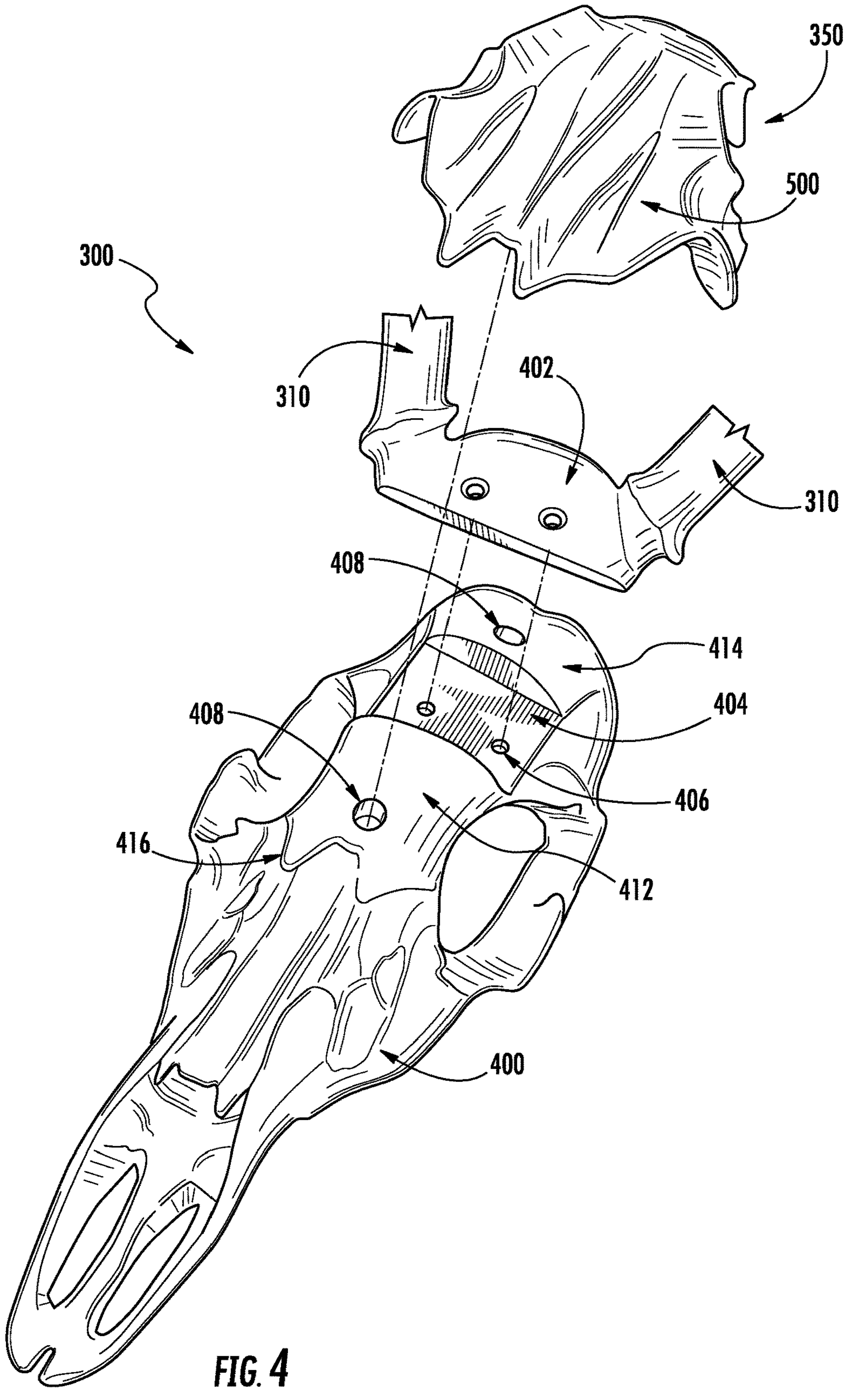
Figure 5:
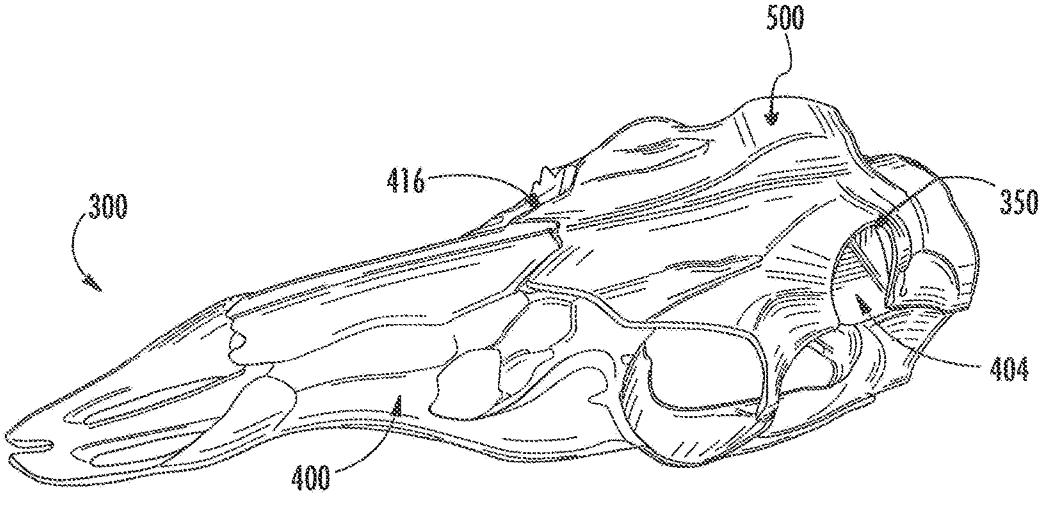
Figure 6:
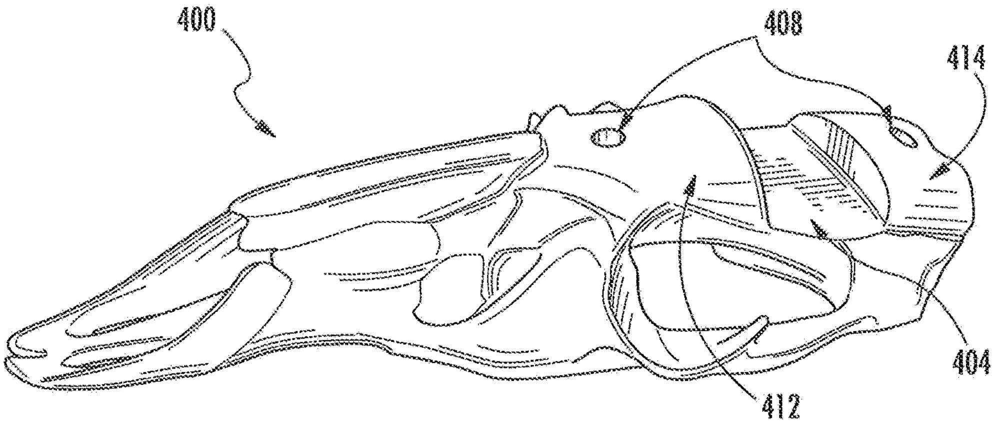
Figure 7:
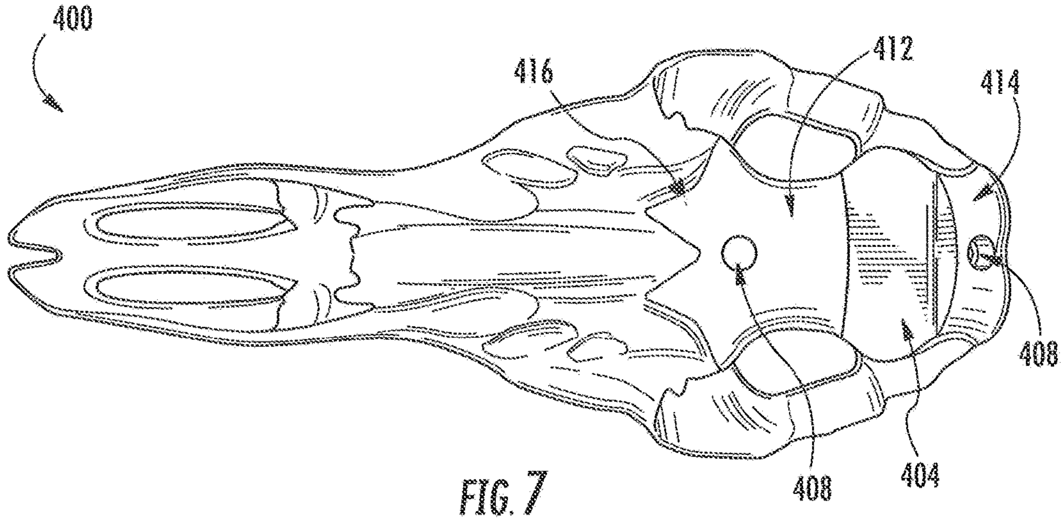
Figure 8:
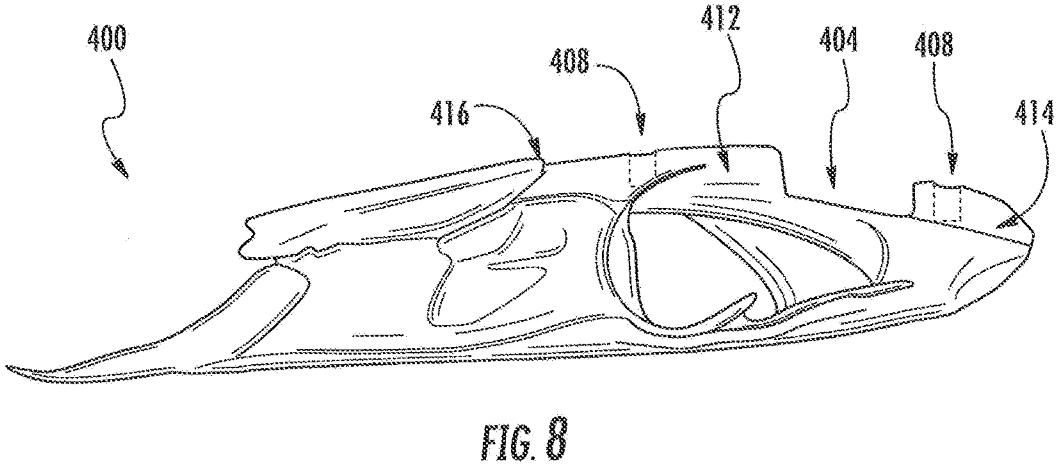
Figure 9:
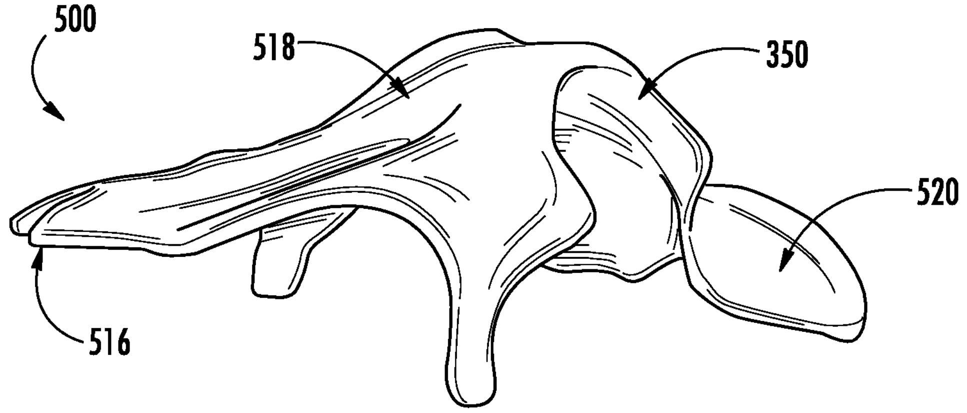
Figure 10:
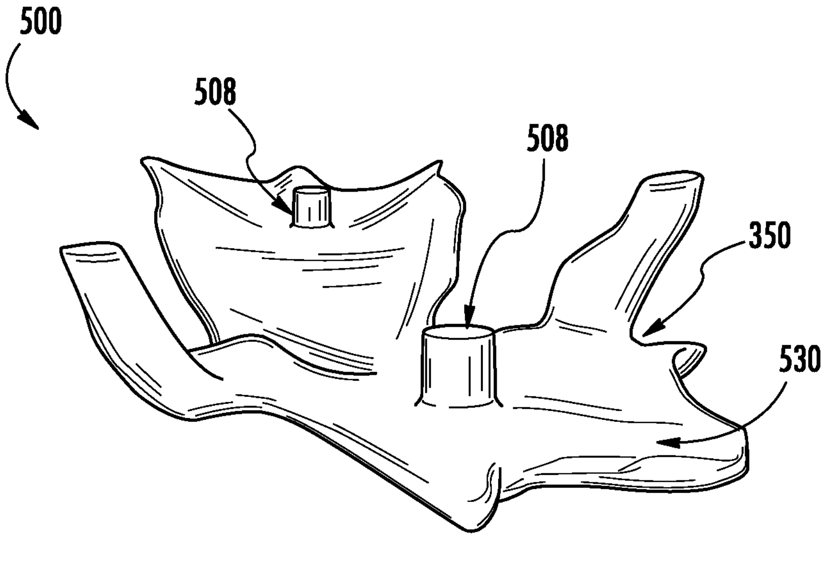
Figure 11:
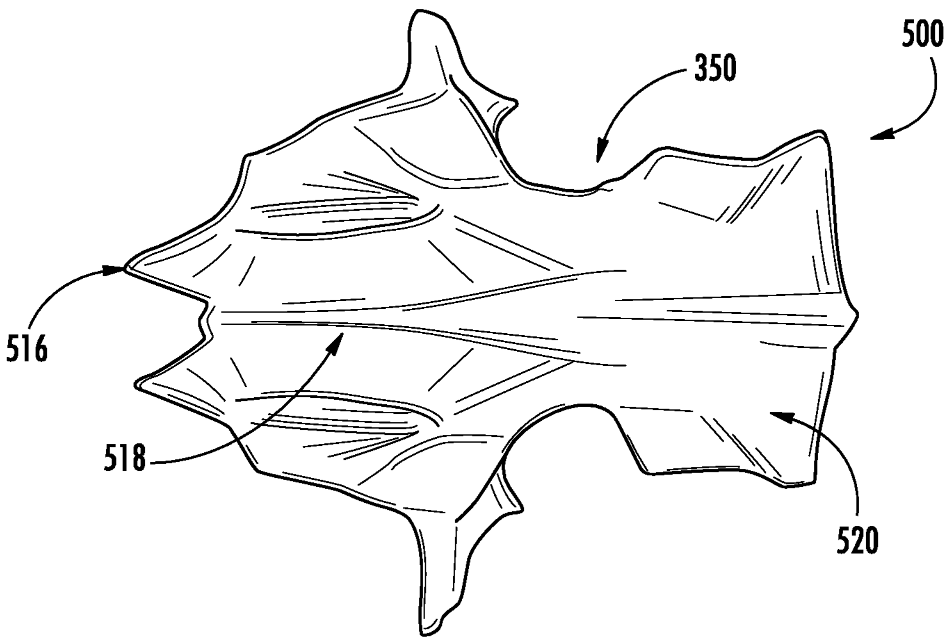
Figure 12:
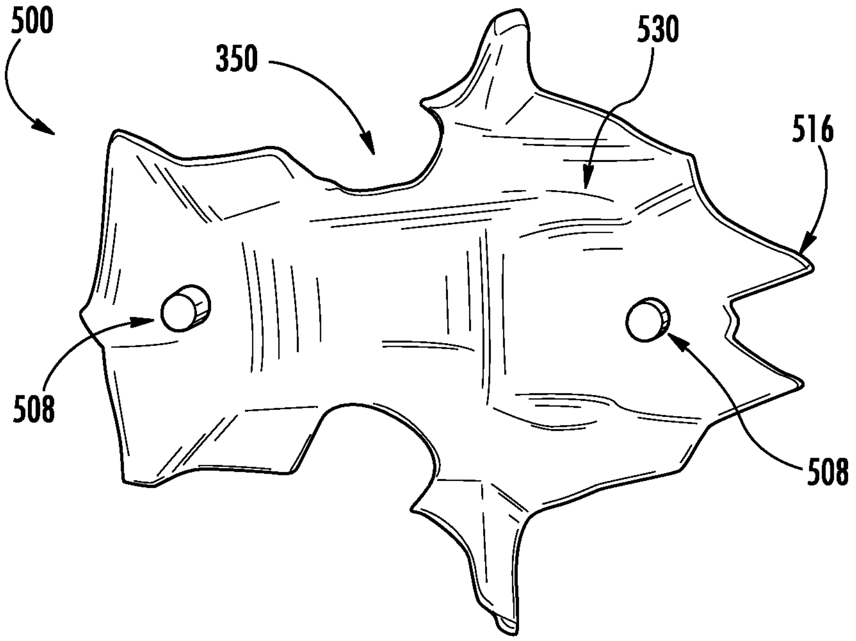
Figure 13:
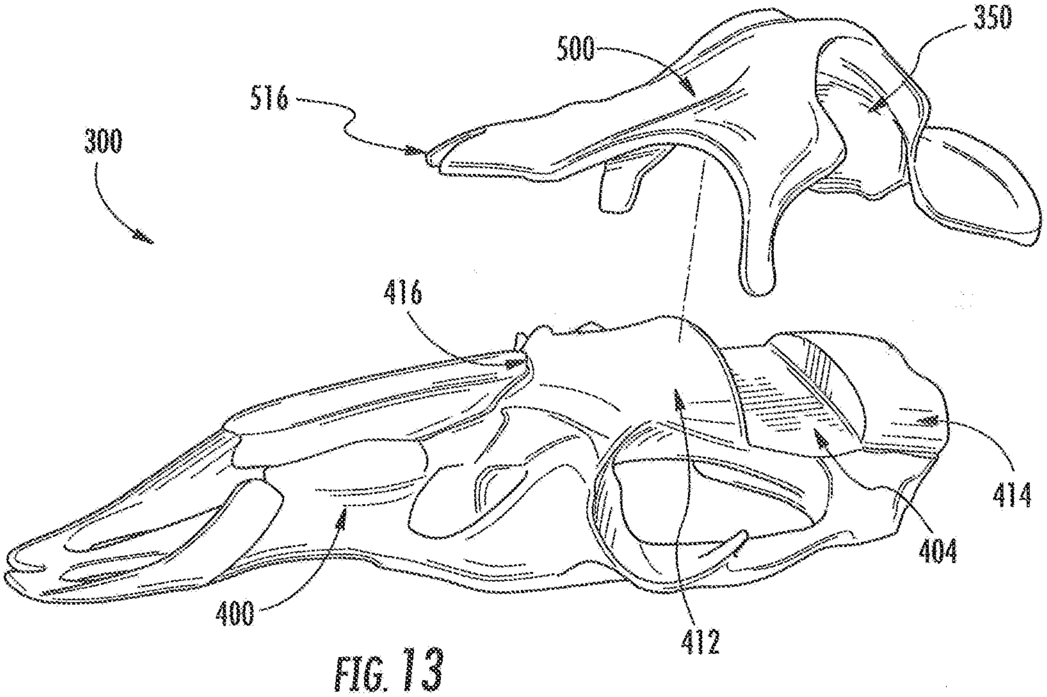
Figure 14:
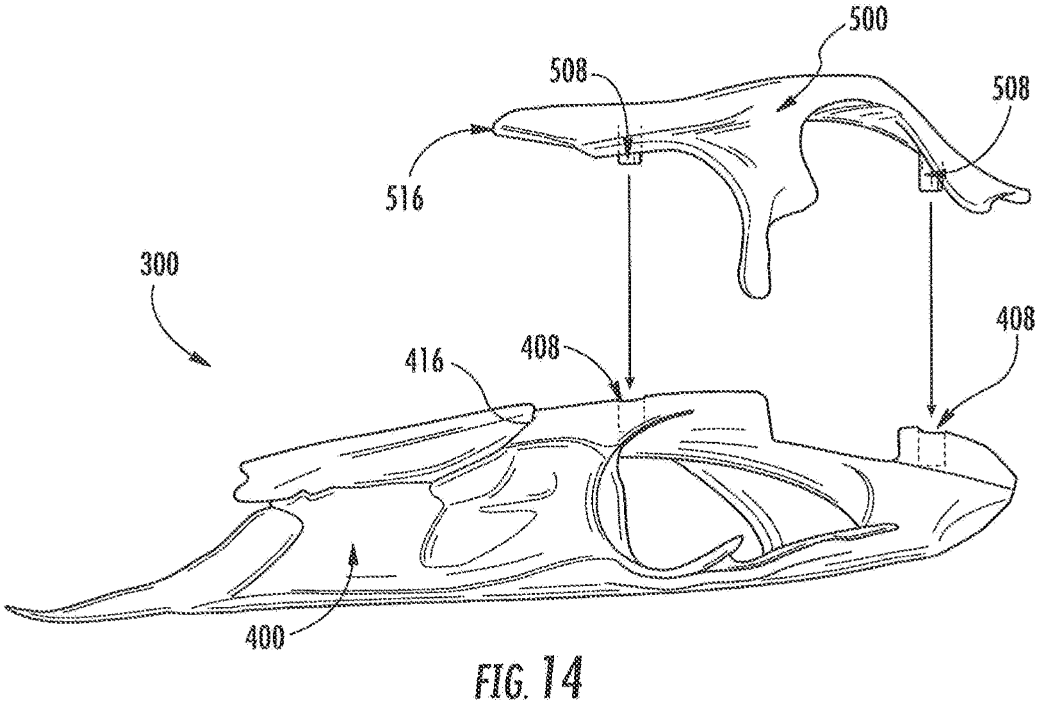
Figure 15:
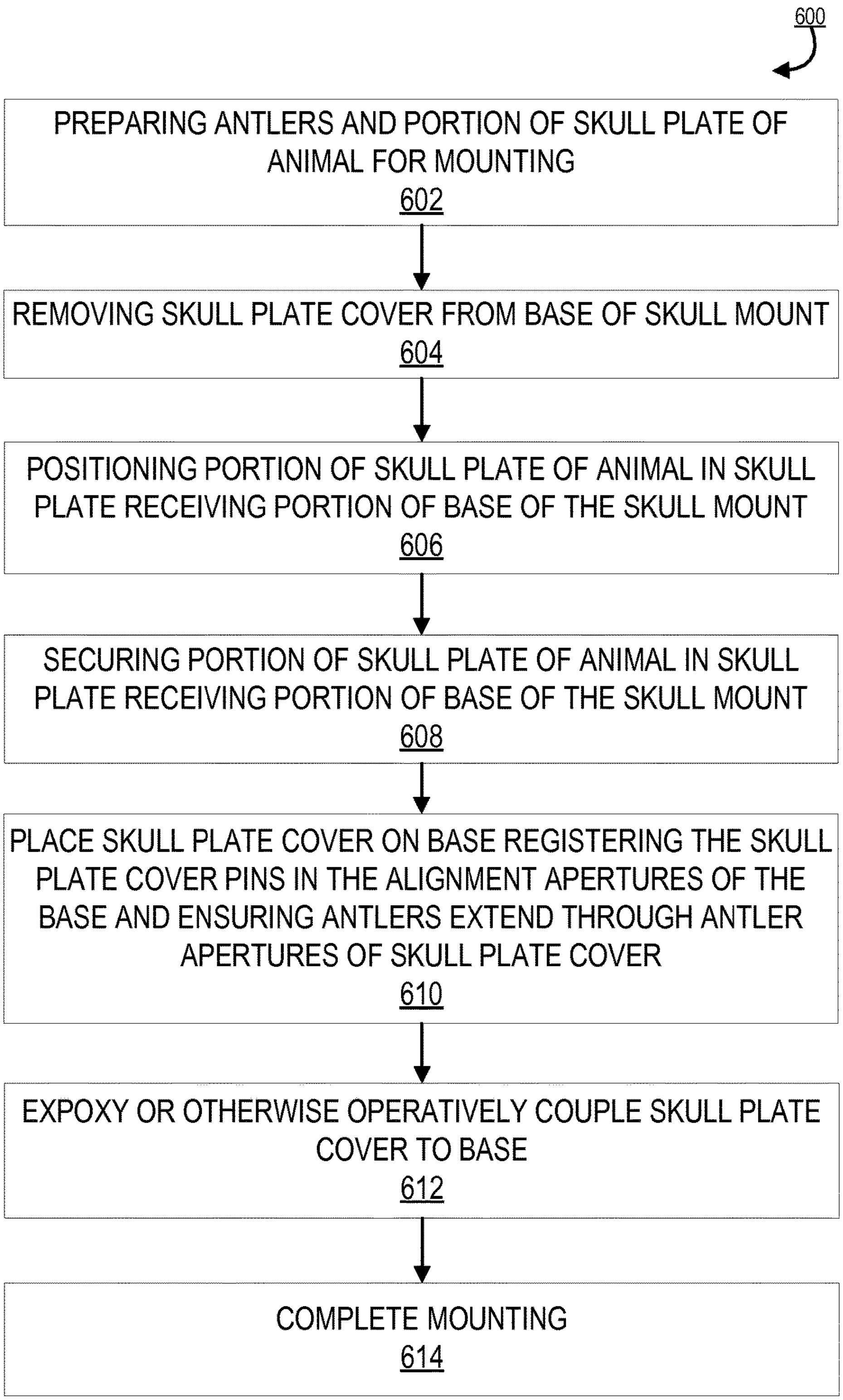

Having thus described embodiments of the invention in general terms, reference will now be made to the accompanying drawings, wherein:

FIG. 1 illustrates a skull mount using pedicle set pins;

FIG. 2 illustrates a skull mount with a skull plate recess;

FIG. 3 provides an illustration of completed skull mount with cover, in accordance with one embodiment of the present invention;

FIG. 4 provides an exploded perspective view of the skull mount, in accordance with one embodiment of the present invention;

FIG. 5 provides a side perspective view of the skull mount without antlers and skull plate, in accordance with one embodiment of the present invention;

FIG. 6 illustrates a side perspective view of a base of the skull mount, in accordance with one embodiment of the present invention;

FIG. 7 illustrates a top view of a base of the skull mount, in accordance with one embodiment of the present invention;

FIG. 8 illustrates a side view of a base of the skull mount, in accordance with one embodiment of the present invention;

FIG. 9 illustrates a side perspective view of a first side of a skull plate cover of the skull mount, in accordance with one embodiment of the present invention;

FIG. 10 illustrates a side perspective view of a second side of a skull plate cover of the skull mount, in accordance with one embodiment of the present invention;

FIG. 11 illustrates a top view of a first side of a skull plate cover of the skull mount, in accordance with one embodiment of the present invention;

FIG. 12 illustrates a top view of a second side of a skull plate cover of the skull mount, in accordance with one embodiment of the present invention;

FIG. 13 illustrates a perspective view of attachment of the base and the skull plate cover of the skull mount, in accordance with one embodiment of the present invention;

FIG. 14 illustrates a side view of attachment of the base and the skull plate cover of the skull mount, in accordance with one embodiment of the present invention; and FIG. 15 provides a process flow illustrating the process of using the skull mount, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, the term skull mount, as used herein describes a taxidermy mount where only the skull of the animal is displayed, which may include horns, antlers or nothing attached to the skull, depending on the animal. In some embodiments, a skull mount may be referred to as a European mount, western skull mount, or western mount.

As used herein, unless otherwise noted, the term skull mold or mount, may refer to an artificially created animal skull formed through a molding process, pourable process, sculpting process, plastic forming process, injection process, or the like. Theses skulls may be formed from plastics, urethanes, plasters, or other moldable materials. Artificial skull molds for skull mounts are typically favored compared to using a real animal skull for a skull mount. This is due to the demanding and specialized methods of removing muscle and other flesh tissue from a skull and leaving a clean, non-brittle skull. In some embodiments, this is done by boiling, scraping, salting, and tanking the skull. In other embodiments, specialized dermestidae beetles may be used to clean the skull for mounting. These traditional methods typically require a specialized taxidermist skill set and/or specialized beetles for the mount to be completed.

FIG. 1 illustrates a representation of a skull mount using pedicle set pins. This skull mount is used when individual antlers are separated from the skull plate of an animal. An example of using this skull mount is when shed antlers or fallen antlers are used in the mount. The skull mount 100 may be a skull mount and form a mold of a desired animal skull that may have horns or antlers associated therewith.

Furthermore, the skull mount 100 of this embodiment of a skull mount may include one or more areas where an antler may extend from. In some embodiments, and as illustrated in FIG. 1, these areas may accept a pedicle set pin 108 via a pedicle pin aperture 118 located in the pedicle of the skull mount 100. In other embodiments, the areas may allow for a screw to be inserted from under the skull mount 100 or under a portion of the skull mount 100 and screwed through a pedicle of the skull mount 100 into the antler 110. The pedicle set pin 108 or screw may also be inserted into the bottom side of the antler 106. In this way, the pedicle set pin 108 may be drilled and installed into the bottom of the antler 106. This portion of the antler 110 may require filing or flattening just below the crown 112 of the antler 110 in order to cleanly mate to the skull mount 100.

In this type of skull mount the antlers 110 may be attached to the skull mount 100 via screws or pedicle set pins 108. Mounting the antlers 110 independent from each other leads to potential differences in rake and/or splay of the antlers. In this way, if the screws or pedicle set pins 108 are not drilled or set into the exact same angle into both the antler 110 and the skull mount 100, the antlers may appear out of position relative to each other. Furthermore, this type of skull mount has a set location that each antler extends from. However, this may not match the actual animal. In many cases, the splay angle, rake angle, distance between the base of the antlers, general location on the antlers on the skull mount 100, and overall position of the antlers relative animal's skull are not accurately represented in this type of skull mount.

FIG. 2 illustrates a representation of a skull mount with a skull plate recess 200. This skull mount is used when the antlers or horns are still attached to the skull plate of the animal. This skull mount provides a benefit over the skull mount disclosed in FIG. 1 because the inclusion of the animal skull plate provides a realistic rake and splay of the antlers and the antlers are also positioned correctly relative to each other. The skull mount 200 may form a mold of a desired animal skull that may have horns or antlers associated therewith.

Furthermore, the skull mount 200 of this embodiment may include a skull plate recess 204 which may accept a portion of an animal's skull plate 202. This recess 204 may be a notch or groove positioned cut out from the skull mount 200. The skull plate recess 204 may be of varying depths and widths based on the type of animal skull being represented by the skull mount 200.

In this type of skull mount, the antlers 210 may be attached to the skull mount 200 via a portion of the animal's skull plate 202. The animal's skull plate 202 may be a portion of the skull plate between the antlers 210 of the animal. In this way, a portion of the animal's skull plate 202 may be affixed to the skull mount 200 within the skull plate recess 204. The portion of the animal's skull plate 202 may be affixed via epoxy, glue, or screwed into the skull mount 200 and more specifically into the skull plate recess 204 of the skull mount 200.

Mounting the antlers 210 using the animal's skull plate 202 provides a more accurate representation of the rake, splay, and positioning of the antlers 210 relative to the skull mount 200. However, this type of skull mount leaves gaps, noticeable inconsistencies, and in some embodiments, screw heads, visible in the area around where the animal's skull plate 202 is mounted into the skull plate recess 204. As such, this leaves a potentially less than desirable look for the upper portion of the animal skull mount when complete because the consistency and details of the skull mount are lost in the area where the skull plate 202 is attached. In some embodiments, this is concealed by wrapping the skull plate 202 in a fabric, such as leather or the like. In other embodiments, a filler, such as an epoxy or the like, is used to fill the gaps and recreate the details of the top portion of the skull on the skull mount 200. The filler is then shaped and painted to match the skull mount 200.

The skull mount using pedicle set pins 100 and skull mount with a skull plate recess 200 illustrated in FIG. 1 and FIG. 2 respectfully both provide for skull mounting mechanisms for mounting or displaying an animal skull with antlers or horns. However, each has deficiencies. The skull mount using pedicle set pins 100 requires the mounting the antlers independent from each other, which leads to potential differences in rake and/or splay of the antlers. Furthermore, this type of skull mount has a set location that each antler extends from, which may not match the actual animal. In many cases, the splay angle, rake angle, distance between the base of the antlers, general location on the antlers on the skull mount, and overall position of the antlers relative animal's skull are not accurately represented in this type of skull mount. The skull mount with a skull plate recess 200 provides a more accurate representation of the rake, splay, and positioning of the antlers relative to the skull mount. However, this type of skull mount leaves gaps, noticeable inconsistencies, and in some embodiments, screw heads, visible in the area around where the animal's skull plate is mounted into the skull plate recess of the skull mount. As such, this leaves a potentially less than desirable look for the upper portion of the animal skull mount when complete.

FIG. 3 illustrates of completed skull mount with cover 300, in accordance with one embodiment of the present invention. FIG. 3 illustrates a skull mount that is completed and includes the antlers. The skull mount of FIG. 3 comprises a skull mount that includes two mold pieces. The skull mount includes a base 400 and a skull plate cover 500. The base 400 of the skull mount generally comprises a mold representing at least the premaxilla, incisive foramen, nasals, maxilla, preorbital vacuity, jugal, and the like portions of the skull of an animal. The skull plate cover 500 of the skull mount generally comprises the frontal and parietal portions of the skull as well as the detail associated with the skull bone formation associated therewith. The skull plate cover 500 forms a cover over a skull plate of an animal that may include antlers 310. In some embodiments, the antlers can be integral with the skull plate. In some embodiments, the antlers can be attached to the skull plate of the animal, a mold of a skull plate, or another like mold.

The skull plate cover 500 forms part of a recess or opening for the skull plate to fit between the skull plate cover 500 and the base 400. In some embodiments, the skull plate may be the skull plate of the animal. In other embodiments, the skull plate may be a mold of the skull plate of the animal. In still other embodiments, the skull plate may be another like mold.

In some embodiments, the skull mount provides the benefit of including the animal's skull plate with antlers to provide the proper rake and splay to the antlers. Furthermore, the skull plate cover 500 provides a cover over the mounting region of the skull plate of the animal, such that the skull mount is anatomically accurate and comprises details on the skull plate cover 500 that are generally associated with that animal skull region.

The antlers 310 remain affixed to or operatively coupled to a portion of the animal's skull plate. The skull plate is concealed within a space created between the skull plate cover 500 and the base 400. The area between the skull plate cover 500 and the base 400 includes an antler aperture 350 that allows the antlers 310 to extend out from the skull mount 300 in the proper location for the animal.

FIG. 4 provides an exploded perspective view of the skull mount 300, in accordance with one embodiment of the present invention. As illustrated, the base 400 and the skull plate cover 500 of the skull mount 300 may be made from a plastic, plaster, or other shapeable material and formed into a skull mount of a desired animal using press molding, injection molding, cast molding, or the like. The desired animal may be any animal with horns, antlers, or skull shape that an individual may wish to display, these animals may include, but are not limited to deer, caribou, moose, elk, or the like.

The base 400 of the skull mount 300 includes the orbitals and snout or nose region of the skull. Furthermore, the base 400 comprises a skull plate receiving portion 404 to accept a skull plate 402 of an animal. The skull plate 402 may be the skull plate of the animal, a mold of the skull plate, or the like. The depth of the skull plate receiving portion 404 is dependent on the thickness of the animal's skull plate 402 and may be varied depending on the animal species. In some embodiments, the skull plate receiving portion 404 may be a cut out portion of the base 400 that allows for a skull plate 402 of an animal to fit in and not extend above the base 400. In some embodiments, the skull plate receiving portion 404 of the base 400 provides for a portion of the skull plate 402 of the animal to fit in and a portion of the skull plate 402 to extend above the top of the base 400. In yet other embodiments, the skull plate receiving portion 404 allows the skull plate 402 to rest on the top of the base 400. The final skull mount may hide the skull plate 402, but a portion of the skull plate cover 500 and/or a portion of the skull plate receiving portion 404 may provide an area for the skull plate 402 to reside and be hidden from view. The skull plate 402 of the animal may be a partial or cut skull plate 402 connecting the antlers 310 of the animal. In this way, the skull plate 402 is not the entire skull plate of the animal, but instead is a portion of the skull plate of the animal that is between the antlers 310 and includes a portion of the skull plate that supports the antlers 310. In some embodiments, the skull plate receiving portion 404 may comprise apertures or dimples 406 for registration of screws for mounting and supporting the skull plate 310 to the base 400. In other embodiments, apertures or dimples 406 are not present on the skull plate receiving portion 404. In this way, a skull plate 402 may be screwed or glued to the base 400 of the skull mount 300 within the skull plate receiving portion 404. In other embodiments, the skull plate 402 may be operatively coupled to the base 400 via other means, such as friction or the like.

The base 400 of the skull mount 300 is relieved in order to accept a skull plate cover 500. The relief is located above or around the orbital and extends along the surface of the base 400, such that the skull plate receiving portion 404 bisects the relief. The relief is the thickness of the skull plate cover 500, such that when the skull plate cover 500 is positioned on the base 400, the assembly creates a skull mount mold 300 and gives the appearance of a single piece skull. In order to create this appearance, the initial relief portion 416 of the base 400 is created along a natural ridge, skull line, or indention on the skull. In the embodiment illustrated in FIG. 4, this initial relief portion 416 is created where the nasal and frontal portions of the skull meet. The relief portion comprises a first relief portion 412 and a second relief portion 414. These relief portions 412 and 414 are separated by the skull plate receiving portion 404. Each relief portion 412 and 414 comprise an alignment aperture 408. The alignment aperture 408 accepts pins located on the skull plate cover 500 to ensure correct positioning of the skull plate cover 500 onto the base 400. Furthermore, the alignment apertures 408 provide additional glue area for operatively coupling the base 400 to the skull plate cover 500. In some embodiments, there are no alignment apertures 408 required, but instead the base 400 operatively couples to the skull plate cover 500 via glue, fixtures, fasteners, pins, or the like.

As illustrated in FIG. 4, the partial skull plate 402 of the animal is positioned onto the base 400. The skull plate 402 may be the skull plate of the animal, a mold of a skull plate, or another like mold. The skull plate 402 is then affixed or operatively coupled to the base 400 via epoxy, glue, screws, friction, or the like. As illustrated in the embodiment of FIG. 4, screws are used with pilot holes drilled through the skull plate 402. Once the skull plate 402 is operatively coupled to the base 400, the skull plate cover 500 may be placed in the relief 412 and 414 of the base 400. In some embodiments, the skull plate cover 500 may be operatively coupled to the base 400 via epoxy, glue, screws, or the like. The skull plate cover 500, outlined in further detail below, along with the base 400 forms a cavity that the skull plate 402 resides in, while being covered by the skull plate cover 500 and allowing antlers 310 extending from the skull plate 402 to be extending from the skull mount 300 through antler apertures 350, aligned correctly and naturally for the animal.

FIG. 5 illustrates a side perspective view of the skull mount without antlers and skull plate, in accordance with one embodiment of the present invention. As illustrated, the skull mount 300 comprises the skull plate cover 500 and the base 400. As illustrated in FIG. 5, the skull plate cover 500 and the base together form one continuous skull mount 300. In this way, a portion of the skull plate cover 500 and the base 400 form the orbital or for the eye within the skull mount 300. Furthermore, the initial relief portion 416 in the base 400 allows for registration of the skull plate cover 500 to form a continuous skull mount 300.

As further illustrated in FIG. 5, the skull plate receiving portion 404 of the base 400 and the antler aperture 350 of the skull plate cover 500 combined to form a cavity in the skull mount 300. This cavity provides for receiving and concealing of a skull plate of an animal, skull plate mold, or other similarly functioning mold.

FIGS. 6-8 illustrate various views of the base 400 for the skull mount. FIG. 6 illustrates a side perspective view of the base 400 of the skull mount. In the embodiment illustrated in FIG. 6, the skull plate receiving portion 404 may be a recess in a portion of the base 400. This recess allows for a portion of a skull plate of an animal to be received and register into the recess. In some embodiments, this recess is deep enough to accept a skull plate of an animal and for the skull plate of the animal be flush with the relief portions 412 and 414 of the base 400. In other embodiments, this recess may be deep enough to accept a skull plate of an animal and for the skull plate of the animal to be lower than the relief portions 412 and 414. In yet other embodiments, this recess may be deep enough to accept a skull plate of an animal and for the skull plate of the animal to be higher than the relief portions 412 and 414. In still other embodiments, the skull plate receiving portion 404 may not be recessed into the base 400 at all.

Furthermore, as illustrated in FIG. 6, there are two alignment apertures 408 illustrated. In some embodiments, a single alignment aperture 408 may be present. In yet other embodiments, no alignment apertures 408 may be used.

FIG. 7 illustrates a top view of the base 400 of the skull mount. In the embodiment illustrated in FIG. 7 two alignment apertures 408 are present in the respective relief portions 412 and 414 of the base 400. In some embodiments, these relief portions 412 and 414 are separated by the skull plate receiving portion 404. Further illustrated, the initial relief portion 416 or leading edge of the relief portion is illustrated. As discussed above, in some embodiments, this leading edge or initial relief portion 416 is where the nasal and frontal portions of the skull mount meet.

FIG. 8 illustrates a side view of the base 400. The side view illustrates the initial relief portion 416 or leading edge of the relief portion. Furthermore, the remaining relief portions 412 and 414 allow the skull plate cover 500 to be positioned such that it is flush with the remaining portions of the base 400. This initial relief portion 416 is, in some embodiments where the nasal and frontal portions of the skull meet. The nasal portion being part of the base 400 and the frontal portion being part of the skull plate cover 500. In some embodiments, the initial relief portion 416 may be at one or more other portions within the skull mount. The portions within the skull mount that may separate the base 400 from the skull plate cover 500 may be any location where a natural break, ridge, line, or separation may occur within the animal's skull, this presenting a natural looking skull mount.

FIGS. 9-12 illustrate various views of the skull plate cover 500. FIG. 9 illustrates a side perspective view of a skull plate cover 500. The skull plate cover 500 registers into and on the base and together forms a complete skull mount. The skull plate cover 500 includes a first side 520 and a second side, illustrated below in FIGS. 10 and 12. The first side 520 faces away from the base 400 and includes skull plate details 518 that are typically found on a skull plate of the animal of the mold. These skull plate details 518 may include one or more ridges, lines, plates, or the like. Furthermore, the skull plate cover 500 illustrated in FIG. 9 illustrates the leading edge 516 of the skull plate cover 500. The leading edge 516 is as thick as the relief provided in the base 400, such that the skull plate cover 500 sits flush with the base 400 to create a skull mount 300. Furthermore, the first side 520 as illustrated in FIG. 9 further provides for an antler aperture 350 that allows the antlers 310 to extend out from the skull mount 300 in the proper location for the animal.

FIG. 10 illustrates a side perspective view of a second side 530 of a skull plate cover 500 of the skull mount 300, in accordance with one embodiment of the present invention. The second side 530 is the side of the skull plate cover 500 that faces the base 400 of the skull mount 300. In this way the second side 530 comprises, in some embodiments, at least one registration pin 508 for registering with the registration aperture 408 of the base 400. In some embodiments, the skull plate cover 500 includes at least one registration pin 508. In other embodiments, the skull plate cover 500 includes one registration pin 508. In still other embodiments, the skull plate cover 500 does not have a registration pin 508. In this way, the registration pin 508 is sized such that the registration pin 508 may fit into the registration aperture 408 of the base 400. In some embodiments, there is no registration pins 508 are present, but instead the base 400 operatively couples to the skull plate cover 500 via glue, fixtures, fasteners, or the like.

FIG. 11 illustrates a top view of a first side 520 of a skull plate cover 500 of the skull mount, in accordance with one embodiment of the present invention. This view illustrates the leading edge 516 of the skull plate cover 500 that, in this embodiment is created where the nasal and frontal portions of the skull meet. Furthermore, the view FIG. 11 illustrates the skull detail of the first side 520 of the skull plate cover 500. The detail of the first side 520 of the skull plate cover 500 provides a realistic appearance of an animal skull via skull plate details 518. Unlike requiring molding of epoxy or the like as in the skull mount illustrated in FIG. 2 in order to form any type of detail in the skull mount, the first side 520 of the skull plate cover 500 incorporates real-life detail into the skull of the animal in order to provide a more detailed and realistic skull mount. Furthermore, the first side 520 as illustrated provides for an antler aperture 350 that allows the antlers 310 to extend out from the skull mount 300 in the proper location for the animal.

FIG. 12 illustrates a view of a second side 530 of a skull plate cover 500 of the skull mount, in accordance with one embodiment of the present invention. As illustrated the at least one registration pin 508 is illustrated for registering with the registration aperture 408 of the base 400. In some embodiments, one or more registration pins 508 may be present. In other embodiments, no registration pins 508 may be present. Furthermore, FIG. 12 illustrates an antler aperture 350. The antler aperture 350 aids in forming a cavity that the skull plate 402 resides in, while being covered by the skull plate cover 500 and allowing antlers 310 extending from the skull plate 402 to be extending from the skull mount 300 through antler apertures 350, allowing correct alignment of antlers of an animal. In some embodiments, there is no alignment apertures 408 or registration pins 508 present, but instead the base 400 operatively couples to the skull plate cover 500 via glue, fixtures, fasteners, or the like.

FIG. 13 illustrates a perspective view of attachment of the base 400 and the skull plate cover 500 of the skull mount 300, in accordance with one embodiment of the present invention. As illustrated the skull plate cover 500 may be received by the base 400 and registered in the relief portions 412 and 414 of the base 400. As such, the leading edge 516 of the skull plate cover 500 may butt or register directly up against the initial relief portion 416 of the base 400. As illustrated, the skull plate cover 500 includes an antler aperture 350 and also combines with the base 400 to form the orbital bone structure for the eye of the animal. The locations of the separation between the skull plate cover 500 and the base 400 provide a natural break in the skull of the animal, thus when together in the skull mount 300 the skull plate cover 500 and base 400 appear to be a single piece. As illustrated in FIG. 13, no registration pins or apertures are used to operatively couple the skull plate cover 500 to the base 400. The base 400 and skull plate cover 500 may be operatively coupled together via glue, epoxy, fasteners, friction, or the like.

FIG. 14 illustrates a side view of attachment of the base 400 and the skull plate cover 500 of the skull mount 300, in accordance with one embodiment of the present invention. As illustrated in this embodiment, two alignment apertures 408, one on each relief portion, are illustrated. The alignment apertures 408 extend into the base 400 to accept the registration pins 508. The registration of the alignment apertures 408 with the registration pins 508 causes the skull plate cover 500 to register within the relief of the base 400 and provide a seamless skull mount 300. As such, the leading edge 516 of the skull plate cover 500 may butt or register directly up against the initial relief portion 416 of the base 400. The base 400 and skull plate cover 500 may be operatively coupled together via glue, epoxy, fasteners, friction, or the like.

FIG. 15 illustrates a process flow illustrating the process of using a skull mount 600, in accordance with one embodiment of the present invention. The process is initiated by preparing the antlers or horns of an animal for mounting, as illustrated in block 602. This preparation also includes preparing a portion of the skull plate of the animal. In doing so, a user must cut a portion of the animal's skull plate. In this way, the portion of the skull plate of the animal prepared for mounting will include approximately an inch or two wide (from front of skull to back of skull) of the skull plate with both antlers affixed or operatively coupled thereto the skull plate. In some embodiments, the skull plate may be the skull plate of the animal. In other embodiments, the skull plate may be a mold of the skull plate of the animal. In still other embodiments, the skull plate may be a general mold that operatively couples with antlers or horns.

Once the skull plate of the animal is cut to the proper size and cleaned, a user may remove the skull plate cover from the base of the skull mount, as illustrated in block 604. Once removed, the user may gain access to the skull plate receiving portion of the base of the skull mount. With access to this position the user may position the portion of the skull plate of the animal in the skull plate receiving portion of the base of the skull mount, as illustrated in block 606. Once the skull plate is positioned to the user's liking within the skull plate receiving portion of the base, the user may secure the portion of the skull plate of the animal to the skull plate receiving portion of the base, as illustrated in block 608. In some embodiments, the user may screw the skull plate of the animal to the base. In this way, a pilot hole may be drilled through the skull plate and into the base. Subsequently, screws that comprise a slightly larger diameter than the pilot hole may be screwed through the created pilot holes. One or more screws are used to hold the skull plate to the base. In some embodiments, the user may use epoxy to affix the skull plate of the animal to the base. Any sort of epoxy or glue that may affix the skull plate to the base may be used. In this way, once the user has positioned the skull plate in the desired location of the base, the epoxy may be applied to affix the skull plate to the base of the skull mount.

Once the skull plate has been operatively coupled to the base, via screws, epoxy, friction, fasteners, or the like, the process 600 continues by placing the skull plate cover on the base aligning and registering the skull plate cover pins into the alignment apertures of the base and ensuring that the antlers extend through the antler apertures created by the base and skull plate cover, as illustrated in block 610. In some embodiments one or more registration pins and alignment apertures are present. In other embodiments, no registration pins and/or alignment apertures are present. Once positioned in the desired location, the user may operatively couple, via epoxy, friction, fasteners, or the like the skull plate cover to the base, as illustrated in block 612. Finally, as illustrated in block 614, the process 600 is completed by mounting of the skull on a wall, plaque, or the like.

What is claimed is:

1. A skull mount, the skull mount comprising:

a base, wherein the base comprises a mold representing a first set of portions of a skull of an animal; and a skull plate cover, wherein the skull plate cover represents a second set of portions of the skull of the animal, such that the skull plate cover, when registered into the base, gives an appearance of a single piece skull, wherein the skull plate cover covers at least a portion of a skull plate of the animal and at least a portion of the base, wherein the base comprises a skull plate receiving portion and a relief portion, wherein the skull plate receiving portion is configured for receiving at least a portion of a skull plate of an animal, wherein the relief portion is configured for receiving at least a portion of the skull plate cover, wherein the relief portion receives the skull plate cover and allows the skull plate cover to be flush with the base to form the skull mount.

2. The skull mount of claim 1, wherein the base and the skull plate cover form a cavity within the skull mount to accept at least a portion of a skull plate of the animal.

3. The skull mount of claim 2, wherein the cavity further comprises at least one aperture for antlers operatively coupled to a skull plate of the animal to extend through and outside the cavity of the skull mount.

4. The skull mount of claim 1, wherein the skull plate receiving portion further comprises a recess within the base to accept at least a portion of a skull plate of the animal.

5. The skull mount of claim 1, wherein the base further comprises a relief portion for receiving at least a portion of the skull plate cover.

6. The skull mount of claim 5, wherein the base further comprises at least one registration aperture for receiving and registering at least one pin extending from the skull plate cover, wherein the at least one registration aperture is within the relief portion of the base.

7. The skull mount of claim 1, wherein the skull plate cover comprises a first side and a second side, wherein the first side of the skull plate cover comprises skull plate details of the animal.

8. The skull mount of claim 1, wherein the skull plate cover comprises a first side and a second side, wherein the second side of the skull plate cover comprises at least one pin for registering with a registration aperture of the base.

9. The skull mount of claim 1, wherein the base is configured to receive and register the skull plate cover to form the skull mount.

10. The skull mount of claim 1, wherein the skull plate cover further comprises at least one antler aperture that allows antlers operatively coupled to a skull plate of the animal to extend outward from the skull mount.

11. The skull mount of claim 5, wherein the skull plate cover fits into the relief portion of the base, wherein the thickness of the skull plate cover is a same thickness as the relief thus providing a smooth transition between the base and the skull plate cover to form the skull mount.

12. The skull mount of claim 1, further comprising a mold of a skull plate of an animal, the mold being configured to operatively coupled with antlers or horns of an animal.

13. The skull mount of claim 5, wherein the relief portion comprises a first relief portion and a second relief portion, and wherein the skull plate receiving portion of the base comprises a recess located between the first relief portion and the second relief portion and the recess of the skull plate receiving portion is recessed from surfaces of the first relief portion and the second relief portion.

14. The skull mount of claim 1, wherein the base is formed from ridged material capable of accepting a screw or an epoxy for operatively coupling a skull plate of the animal to the base.

15. A skull mount for skull mounting, the skull mold comprising:

a base, wherein the base comprises a mold representing a first set of portions of a skull of an animal; and a skull plate cover, wherein the skull plate cover represents a second set of portions of the skull of the animal, such that the skull plate cover, when registered into the base, gives the appearance of a single piece skull, wherein the skull plate cover covers at least a portion of a skull plate of the animal and at least a portion of the base, wherein the skull plate cover comprises a first side and a second side, wherein the first side of the skull plate cover comprises skull plate details of the animal and second side of the skull plate cover is configured for operative coupling with the base, wherein the base comprises a skull plate receiving portion and a relief portion, wherein the skull plate receiving portion is configured for receiving at least a portion of a skull plate of an animal, wherein the relief portion is configured for receiving at least a portion of the skull plate cover, wherein the relief portion receives the skull plate cover and allows the skull plate cover to be flush with the base to form the skull mount.

16. The skull mount of claim 15, wherein the base comprises at least one registration pin for registering with a registration aperture of the base and wherein the base is configured to receive and register the at least one registration pin of the skull plate via at least one registration aperture to form the skull mold for skull mounting.

17. The skull mount of claim 15, wherein the recess within the base and the skull plate cover form a cavity within the skull mold to accept a skull plate of the animal.

18. The skull mount of claim 15, wherein the skull plate cover comprises at least one antler aperture that allows antlers of the animal to extend outward from the skull mold.

19. The skull mount of claim 15, wherein the base further comprises a relief portion for receiving the skull plate cover, wherein the at least one registration aperture of the base is within the relief portion of the base.

20. The skull mount of claim 19, wherein at least a portion of the skull plate cover fits into the relief portion of the base, wherein the thickness of the skull plate cover is a same thickness as the relief thus providing a smooth transition between the base and the skull plate cover to form the skull mount.

21. The skull mount of claim 15, wherein the base is formed from ridged material capable of accepting a screw or an epoxy for operatively coupling a skull plate of the animal to the base.

22. The skull mount of claim 19, wherein the relief portion comprises a first relief portion and a second relief portion, and wherein the skull plate receiving portion of the base comprises a recess located between the first relief portion and the second relief portion and the recess of the skull plate receiving portion is recessed from surfaces of the first relief portion and the second relief portion.

* * * * *